United States Patent [19]
Tan

[11] 3,753,087
[45] Aug. 14, 1973

[54] METHOD FOR TESTING AND LOCATING FAULTS IN INSULATION OF AN ELECTRICAL APPARATUS AND UTILIZATION OF THE METHOD

[75] Inventor: Tjhing Thian Tan, Baden, Switzerland

[73] Assignee: Aktiengesellschaft Brown, Boveri & Cie, Baden, Switzerland

[22] Filed: June 1, 1971

[21] Appl. No.: 148,535

[30] Foreign Application Priority Data
June 4, 1970 Switzerland.......................... 8364/70

[52] U.S. Cl..................................... 324/52, 324/54
[51] Int. Cl....................... G01r 31/10, G01r 31/12
[58] Field of Search............................ 324/51, 52, 54

[56] References Cited
OTHER PUBLICATIONS

Ganger et al., Ionization Measurements on Transformers Offprint from the Brown Boveri Review 1967, No. 7, pp. 3-15.

*Primary Examiner*—Gerard R. Strecker
*Attorney*—Pierce, Scheffler & Parker

[57] ABSTRACT

A method of testing insulation and pinpointing faults in a winding of electrical apparatus wherein by adjusting a test voltage, a change in the potential difference between the winding and an electrically conductive part is brought about. The purpose of this is to effect a striking and extinction of an electrical discharge at a point between the winding and electrical conductive part which exhibits a weak insulating characteristic which is detected by means of a discharge-indicating device.

12 Claims, 12 Drawing Figures

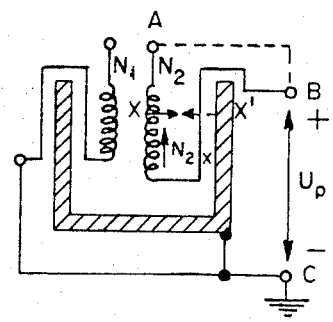
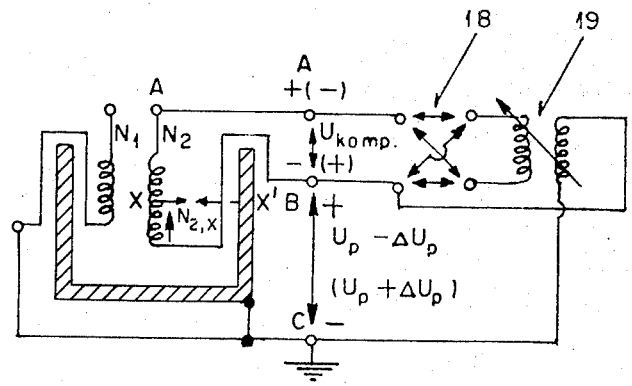
Fig. 5    Fig. 6
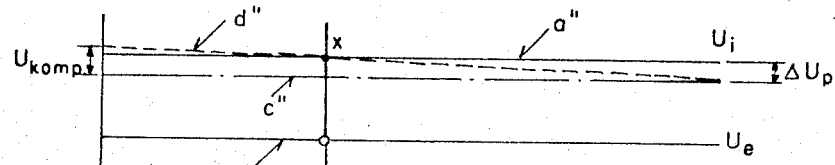
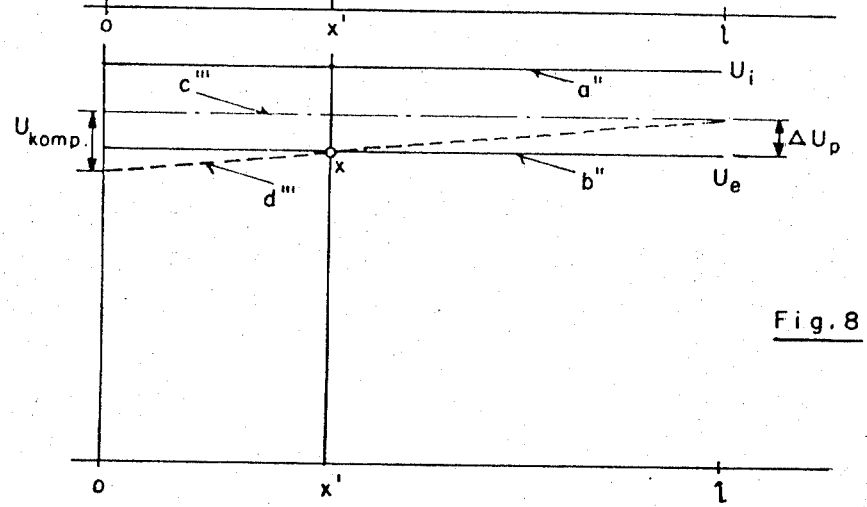
Fig. 7
Fig. 8

METHOD FOR TESTING AND LOCATING FAULTS IN INSULATION OF AN ELECTRICAL APPARATUS AND UTILIZATION OF THE METHOD

The present invention relates to a method of testing insulation and pinpointing faults in an electrical apparatus incorporating at least one winding, this in fact between an electrically conductive component and a winding or coil which is to be tested, the local voltage distribution along the winding as well as along the electrically conductive component, or one of the two said local voltage distributions, and the difference between them, being known in respect of the voltages employed in testing and pinpointing (troubleshooting).

Already, several methods of testing insulation and pinpointing weak points in the dielectric where electrical discharges, for example corona discharges or partial discharges, can occur, this in electrical apparatus containing windings and in particular transformers, are known.

One known method is based upon an acoustic principle, measurements of the transit time of the ultrasonic waves produced by electrical discharges, being made. This method has the drawback that it cannot be applied in practice to discharge locations in the winding block, between the winding and the ion core or any yoke which is provided, in dry transformers or other apparatus containing windings, with or without a non-liquid filled housing, e.g. having gas or araldite insulation. Furthermore, the ultrasonic noise generated by the transformer generally swamps the ultrasonic noise of the electrical discharge and thus makes it possible to detect the latter unless extremely elaborate signal-processing equipment is used to select the desired ultrasonic signal. In order to pinpoint a single partial discharge location, several measurements or measurement channels are needed, for triangulation purposes.

Another known method is based upon bombardment or irradiation with high-energy rays, e.g. x-rays, a reduction in the starting voltage and an increase in the intensity of the electrical discharge when the fault location is bombarded, being encountered. This method has the drawback that it cannot be employed to detect faults located between the winding and the core, within the winding block itself and in situations where the housing of the transformer or the apparatus containing the windings is metal and too thick. Any effective pinpointing is rendered virtually impossible in these circumstances not only by the scattering of the additional radiation when it encounters metallic components, but also because of the associated secondary radiation.

Another known method is based upon the measurement of the difference in transit time between the pulses produced by the electrical discharges, e.g. partial discharge, as a consequence of the capacitive voltage components and the travelling wave components, or between the pulses of the travelling wave components at the two ends of the winding. This method cannot be employed in practice in situations where the windings are extensively interleaved, in windings provided with other deliberate capacitive control arrangements, e.g., with control plates, or where the winding is highly non-uniform and the measuring system does not present adequately low reflectivity so that fictitious partial discharge location can be simulated.

Another known test method is based upon measurements of the attenuation ratio between the travelling wave currents or voltages appearing at the two ends of the winding, this either in the real-time range (wideband method), or in the frequency range (selective measurement frequency). This method has the drawback that it is virtually out of the question to use it in the case of extensively interleaved windings or windings with some other deliberate capacitive control, e.g. control plates. In the case of partial discharge locations occurring near the ends of the windings, this method likewise falls down if the procedure in accordance with Harold and Sletton is adopted, using the frequency range.

Another test method already known is based upon determination of the voltage capacitively transmitted to the winding ends as a consequence of the electrical discharge, for example a partial discharge, this determination being effected either by measurement of the ratio between the voltages at the two ends of the winding or by direct measurement of the amplitude. In the case of windings with a relatively high $\alpha$ factor $$\alpha = \sqrt{\text{Earth capacitance/Series capacitance}}$$

and in the case of single-layer windings, it is virtually out of the question to employ this method.

Again, when using direct measurement of amplitude, the formulae available are highly approximative ones, and this constitutes an obstacle to satisfactory pinpointing.

Yet another known method is based upon the measurement of the damped, relatively low-frequency natural oscillations of the overall system (including the measuring arrangement), this either by determination of the logarithmic detriment, by setting to zero using a bridge arrangement, or by direct measurement of amplitude. This procedure has the drawback that it is sensitive to the measuring arrangement itself since the significant natural oscillation is not determined exclusively by the test subject. Furthermore, measurement involves the use of highly approximative formulae which neglect the continuously distributed elements, since otherwise an unacceptable degree of outlay would result, replacing these instead by lumped elements about whose quantitive equivalents there is some doubt. In the case of rapid successions of partial discharge pulses, the measurement is made substantially more difficult still. The bridge method, considering for example transformer testing using an induced voltage, cannot be applied in practice. The necessity, where the bridge method is concerned, of using a high-voltage capacitor variable in a ratio of about 1 to 21 and down to 10pF, makes the method difficult to put into practice and is therefore only applicable to low voltages.

The object of the present invention is to create a method which does not exhibit the aforesaid drawbacks of the known methods, is simple and reliable in principle, and fundamentally makes it possible to carry out the pinpointing operation automatically.

The term electrical discharges shall be understood hereinafter as meaning for example glow discharges or partial discharges and, in some circumstances, perforations or flash-overs.

The method of the invention is characterized in that by adjusting a test voltage, a change in the potential difference between the winding and the electrically conductive part, and thus the striking and extinction of an electrical discharge at a point between these two components which exhibits a weak insulation, is brought about, the occurrence of this condition detected by means of a discharge-indicating device and thus the local voltage distributions assignable to these parts or components, and the difference between them in the two limiting conditions of striking and extinguishing of the electrical discharge (these conditions being referred to as striking limiting voltage curves and extinguishing limiting voltage curves; and striking voltage difference curves and extinguishing limiting voltage difference curves), established, the test voltage then so chosen that the local voltage distributions (referred to as test voltage clearance) assignable to the winding and to the electrically conductive component, come to be disposed between the previously determined striking and extinguishing limit voltage curves as close as possible (in accordance with the attainable accuracy measurement and the stability of the auxiliary or test voltage) to the striking or extinguishing limiting voltage curves, depending upon whether the striking or extinguishing of the electrical discharge is used as the indication of the fault pinpointing; and in that and furthermore, along the winding and along the electrically conductive component, by means of an auxiliary voltage, new local voltage distributions and the difference between them (referred to as superimpositon voltage curves and superimposition voltage difference curves) are developed as a consequence of the common influence of auxiliary voltage and test voltage in such a way that the ratio between superimposition voltage difference curve and striking or extinguishing limit voltage difference curve is never constant along the winding, even if auxiliary voltage and/or test voltage are further adjusted, thereupon, by adjusting auxiliary voltage and/or test voltage in a suitable direction, the superimposition voltage difference curve, at the point which corresponds to that position in the winding which is to be pinpointed and which exhibits weak insulation, being brought to an equivalent value (depending upon whether the striking or extinguishing of the electrical discharge is to be taken as the indication of the pinpointing of the fault) to the magnitude of the striking limit voltage difference curve or the extinguishing limit voltage difference curve at the same point, but now however corresponding with the striking or extinguishing limit voltage difference curve at other points, on the one hand, and on the other hand, in accordance with the attainable accuracy of measurement and the stability of auxiliary or test voltage, not having to depart too far therefrom (this at any rate as far as possible), the attainment of this adjusted condition being marked, during the business of adjusting using the auxiliary voltage and/or test voltage, by the striking or extinguishing of the electrical discharge and thus, from the characteristic magnitudes of auxiliary voltage and test voltage applied to this striking or extinguishing time, from the striking or extinguishing level (of the test voltage) belonging to the striking or extinguishing limit voltage difference curve, and from the number of turns in the winding tested, that point in the tested winding which exhibits weak insulation and where the electrical discharge has taken place, being determined.

It is convenient to induce the test voltage in the winding which is to be tested, to connect the voltage source for this induced test voltage to a further winding coupled to the winding under test or, for example in the case of apparatus with only one winding, to connect it directly across the winding ends and, in order to pinpoint a fault which has caused an electrical discharge between the tested winding and an electrically conductive component, to apply the auxiliary voltage between said electrically conductive component and one end of the tested winding.

It may also be convenient to apply the test voltage across the ends of the short-circuited winding or between one end of the open circuit winding and an electrically conductive component and, in order to pinpoint a fault which has produced an electrical discharge between the tested winding and the electrically conductive component to induce the auxiliary voltage in the tested winding, the short-circuiting of the latter, provided that its ends were not already open-circuited during this voltage test, having to be cancelled and the voltage source for the induced auxiliary voltage being connected to a further winding which is coupled with the winding under test, or directly across the ends of the said tested winding.

Preferentially, in actually pinpointing the fault, especially where the striking of the electrical discharge is used as the indicator that the fault has been pinpointed, the test voltage adjusted between the striking and extinguishing voltages of the electrical discharge will be so chosen that the requisite auxiliary voltage is as small as possible.

The subject of the invention is furthermore an application of the method of the invention to insulation testing and fault pinpointing in a transformer, a measurement transducer, a choke coil or a solenoid coil.

In the following, the invention will be explained making reference to several examples of application, illustrated in the drawing, and indeed taking the case of the occurrence of partial discharges between a winding and the housing of a transformer, pinpointing being carried out using a.c. voltages.

FIG. 5 is a fundamental diagram of the arrangement for carrying out insulation testing by an applied voltage;

FIG. 6 is a fundamental diagram similar to that of FIG. 5 showing the pinpointing arrangement;

FIG. 7 is the voltage diagram obtained when using the pinpointing arrangement of FIG. 6, with $U_i$ as the indicator;

FIG. 8 is the voltage diagram obtained when using the pinpointing arrangement of FIG. 6 with $U_e$ as the indicator;

In the ensuing explanations :

$E_p$ = applied test voltage across primary winding ($N_1$ turns); only used when testing with induced voltage.

$U_p$ = test voltage across the secondary winding being tested ($N_2$ turns)

When using an induced voltage for testing, the relationship $U_p = N_2/N_1 \cdot E_p$ applies.

$U_i$ = value of test voltage $U_p$ at which partial discharge strikes.

$U_e$ = value of test voltage $U_p$ at which partial discharge extinguishes.

$U_{komp}$ = auxiliary voltage used to compensate a change in $U_p$.

Let us assume that the point X–X' in the secondary winding is the partial discharge location corresponding to a number of turns $N_{2x}$ where the local voltage between $x$ and the end of the winding which is connected to the earthed housing is $U_x = (N_{2,x}/N_2) \cdot U_p$, and that we are concerned here with a partial discharge from a point in the winding tested to a conductive part of the apparatus (the housing), which is at zero potential.

Figures 1, 2:
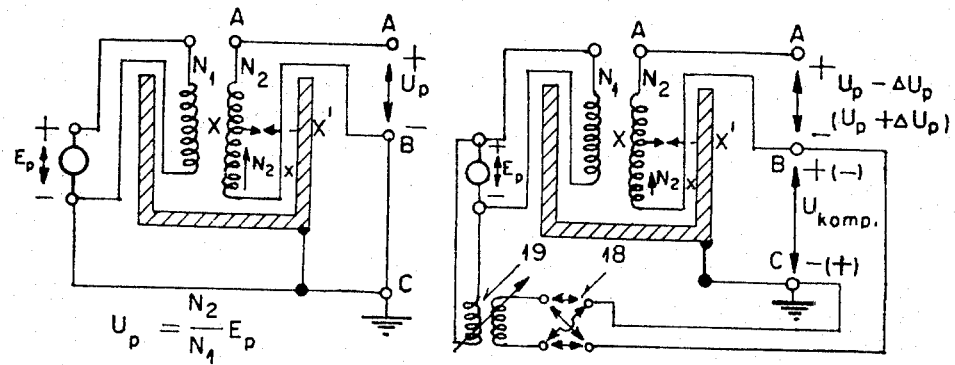
FIG. 1 is the fundamental diagram of an arrangement for carrying out insulation testing using an induced voltage.
FIG. 2 is a fundamental diagram similar to that of FIG. 1, relating this time to the pinpointing arrangement.

In FIG. 1 the fundamental diagram of an arrangement for insulation testing using an induced voltage, is illustrated. If we substitute for the continuous connection BC, an auxiliary voltage of the same frequency as the test voltage, then we obtain the fundamental diagram of FIG. 2 describing the pinpointing arrangement for carrying out testing with reduced voltage.

At commencement (striking) of the partial discharge when $U_P = U_i$, it follows from FIGS. 1 and 2 since $U_x = (N_{2,x}/N_2) \cdot U_p$, that for the partial discharge striking voltage at the point X–X', we obtain :

$$U_{i,x} = (N_{2,x}/N2) \cdot U_i$$

Figure 3:
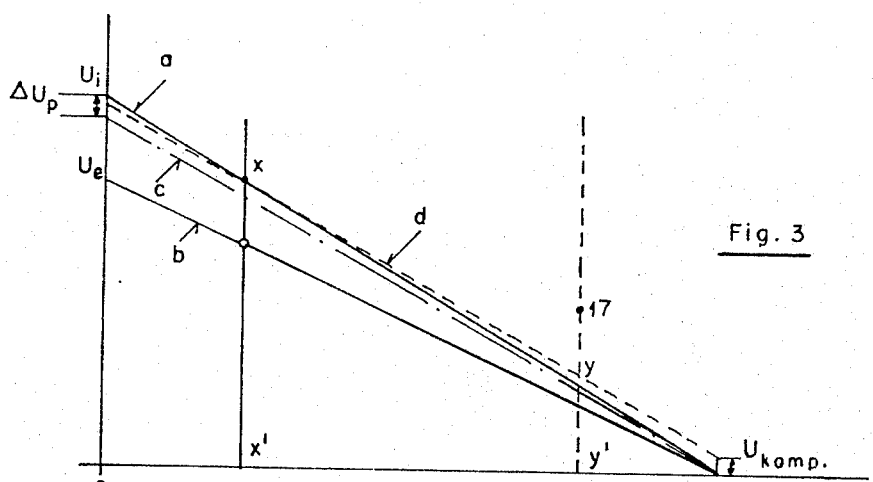
FIG. 3 is the voltage diagram when employing the pinpointing arrangement of FIG. 2, with the partial discharge striking voltage $U_i$ as the indicator.

As the test voltage $U_p$ is increased, it is possible, for example using a known kind of narrow-band parasitic voltage measuring device, quite simply to determine the striking of the partial discharge and therefore the $U_i$ value and, because the pattern of the voltage distribution along the winding is assumed to be known a priori, the associated striking limit voltage curve a (FIG. 3) assigned to the secondary winding, is known as well.

$U_p$ is then reduced until the partial discharge extinguishes, from which $U_e$ is obtained and, because the pattern of the voltage distribution along the winding is known, it is also possible to determine the extinguishing limit voltage curve b (FIG. 3) assigned to the secondary winding. After the extinguishing of the partial discharge, the test voltage $U_p$ is raised until there is the smallest possible $\Delta U_p$ value vis-a vis $U_i$, so that a new voltage curve, the test voltage curve c (FIG. 3), is obtained which lies between the two previously determined striking and extinguishing limit voltage curves a and b and is assigned to the secondary winding. If, then, a co-phasal auxiliary voltage $U_{komp}$ is applied across the terminals B and C (FIG. 2), a new resultant voltage curve, the superimposition voltage curve d (FIG. 3) is obtained, which is now assigned to the tested secondary winding. Here, at the point X–X', we have the condition :

$$U_x = (N_{2,x}/N_2) \cdot (U_i - \Delta U_p) + U_{komp}$$

The voltage $U_{komp}$ is then varied until the condition $U_x = U_{i,x}$ obtains, whereupon the partial discharge strikes again. From this, it follows that :

$$(N_{2,x}/N_2) \cdot (U_i - \Delta U_p) + U_{komp} = (N_{2,x}/N_2) \cdot U_i$$

or $$0 < (N_{2,x}/N_2) = U_{komp}/\Delta U_p \leq 1$$

In this fashion, the faulty turn at the point X–X' can be determined directly from the ratio of the measured voltages $U_{komp}$ and $U_p$ and the total number of turns in the winding. Because, when using the striking of the electrical discharge as the indicator which marks the pinpointing of the fault, the condition $U_{p,y} + U_{komp.} > U_{i,y}$ applies at the point y–y' (FIG. 3, when $U_x = U_{i,x}$, the auxiliary voltage $U_{komp}$ which is required should be as small as possible in order with a probability bordering on certainty not to cause any other potential partial discharge locations, e.g. at 17 (something which in transformers with stepped insulation, is not inconceivable under unfavourable circumstances), to produce discharges. In transformers with full insulation, where the winding has an equal thickness of insulation over its whole length, the possibility of this happening is virtually completely excluded. Nevertheless, in order as far as possible to maintain the original condition, in pinpointing the fault the test voltage, depending upon what selection of indicator is made in order to establish that the fault has been pinpointed, should be adjusted so close to the striking or extinguishing voltage that the smallest possible auxiliary voltage is needed to actually effect pinpointing. Self-evidently, it is equally possible, instead of the auxiliary voltage $U_{komp}$, to adjust the test voltage $U_p$ until the condition $U_x = U_{i,x}$ is obtained.

If the position of the resultant superimposition voltage curve d is changed through adjustment of the test voltage $U_p$, it is advantageous to previously select a relatively low auxiliary voltage $U_{komp}$.

Figure 4:
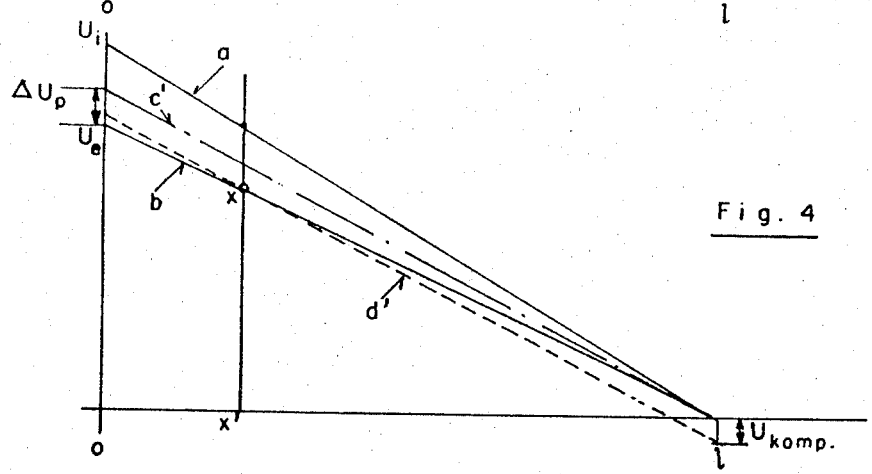
FIG. 4 is the voltage diagram obtained when using the pinpointing arrangement of FIG. 2, with the partial discharge extinguishing voltage $U_e$ as the indicator.

In the following, the same method of pinpointing, this time however using the extinguishing of the partial discharge of the indicator, will be explained making reference to FIGS. 1, 2 and 4. In accordance with FIG. 2, a switch 18 is provided for the purpose, this in order to subtract the test and auxiliary voltages from one another instead of adding them.

$U_i$ and $U_e$ are determined in the same way as in the preceding example so that the striking limit voltage curve a and extinguishing limit voltage curve b assignable to the winding under test, are known.

When $U_p = U_e$, the partial discharge extinguishes, i.e. the partial discharge extinguishing voltage at the point X–X' is $$U_{e,x} = (N_{2,x}/N_2) \cdot U_e$$

Subsequently, $U_p$ is briefly raised again to somewhat above $U_i$ so that the partial discharge strikes again. After this has happened, the test voltage is lowered again until there is the smallest possible $\Delta U_p$ value vis-a-vis $U_e$, so that a new voltage curve, the test voltage curve c' (FIG. 4), which is located between the two previously determined striking and extinguishing limit voltage curves a and b and is assignable to the secondary winding, is obtained, this representing the adjusted condition. If, then, an antiphase auxiliary voltage $U_{komp}$ is applied across the terminals B and C (FIG. 2), a new resultant voltage curve (the superimposition voltage curve $d'$ (FIG. 4), is obtained, which is now assigned to the secondary winding under test. In this context, we have the condition $$U_x = (N_{2,x}/N_2) \cdot (U_e + \Delta U_p) - U_{komp}$$

at the point X–X'. The auxiliary voltage $U_{komp}$ is then altered until $U_x = U_{e,x}$, whereupon the partial discharge extinguishes again, from this it follows that :

$$(N_{2,x}/N_2)(U_e + \Delta U_p) - U_{komp} = (N_{2,x}/N_2) \cdot U_e \text{ or}$$

$$0 < (N_{2,x}/N_2) = U_{komp}/\Delta U_p \leq 1$$

In this way too it is possible to calculate the position X–X' of the faulty turn, relatively simply. Self-evidently, it is possible here, too, to regulate the test voltage $U_p$ instead of the auxiliary voltage $U_{komp}$, until the condition $U_x = U_{e,x}$ applies, or to regulate both said voltages.

In FIG. 5, by way of another example the fundamental diagram of an arrangement for insulation testing by means of an applied voltage, is illustrated. If an auxiliary voltage of the same frequency as the test voltage is applied across the pair of terminals AB, then the fundamental diagram illustrated in FIG. 6, of the pinpointing arrangement used for testing with an applied voltage, is obtained, i.e. in which the test voltage is applied between the secondary winding of the test, and the primary winding of the housing. Here, as FIG. 2 shows, once again a switch 18 and a voltage regulator 19 are provided. In FIG. 6, as in FIG. 2, all the bracketed references relate to the use of $U_e$ as the indicator.

As the best voltage $U_p$ is raised, here again, as already described, the voltage $U_i$ can be determined by means of a partial discharge parasitic voltage measuring instrument, this being the voltage at which a partial discharge strikes; in this way striking limit voltage curve $a''$ (FIG. 7) is obtained which can be assigned to the secondary winding.

Thereafter, $U_p$ is reduced again until the partial discharge extinguishes, thus determining $U_e$ and therefore the extinguishing limit voltage curve $b''$ (FIG. 7) belonging to the secondary winding.

At the partial discharge location X–X', as FIG. 7 shows, we have the condition $$U_{i,x} = U_i$$

After the partial discharge has extinguished, the test voltage $U_p$ is raised again to give the smallest possible $\Delta U_p$ value vis-a-vis $U_i$, so that a new voltage curve, the test voltage curve $c''$ (FIG. 7) located between the two previously determined striking and extinguishing limit voltage curves $a''$ and $b''$, is obtained, this new curve being assignable to the secondary winding. If, then, between the terminals A and B (FIG. 6), a co-phasal auxiliary voltage $U_{komp}$ is induced, a new resultant voltage curve, the superimposition voltage curve $d''$ (FIG. 7), is obtained, which is now assignable to the tested secondary winding. Here, at the position X–X', the condition :

$$U_x = (N_{2,x}/N_2) \cdot U_{komp} + (U_i - \Delta U_p)$$

applies. The auxiliary voltage $U_{komp}$ is then altered until the condition $U_x = U_i$ is obtained, whereupon the partial discharge strikes again at the position X–X'. From this it follows that :

$$(N_{2,x}/N_2) \cdot U_{komp} + U_i - \Delta U_p = U_i \text{ or}$$

$$0 < (N_{2,x}/N_2) = \Delta U_p/U_{komp} \leq 1$$

With the aid of this formula, after the determination of $\Delta U_p$ and $U_{komp}$, the faulty position in the winding can be calculated directly from the total number of turns $N_2$ in the tested winding. Self-evidently, it is equally possible instead of the auxiliary voltage $U_{komp}$ to so adjust the test voltage $U_p$ that $U_x = U_i$ obtains, or to adjust both voltages. For reasons similar to those applying in the case of testing and pinpointing with an induced test voltage, as described in FIG. 2, likewise when testing and pinpointing using an applied test voltage $\Delta U_p$ should preferably be chosen as small as possible so that the requisite auxiliary voltage $U_{komp}$ is kept to a minimum as well.

If the extinguishing of the partial discharge is used as the indicator, then first of all $U_i$ and $U_e$ and therefore the striking and extinguishing limit voltage curves $a''$ and $b''$ (FIG. 8) are determined, in the same manner as in the foregoing example. Then, $U_p$ is again briefly raised to above $U_i$ so that the partial discharge strikes again. After this happens, the test voltage $U_p$ is reduced again to give the smallest possible $\Delta U_p$ value vis-a-vis $U_p$, so that a new voltage curve, the test voltage curve $c'''$ (FIG. 8) which is located between the two previously determined striking and extinguishing limit voltage curves $a''$ and $b''$, is obtained, which new curve is assignable to the secondary winding and represents the adjusted condition. If, then an antiphase auxiliary voltage $U_{komp}$ is induced across the terminals A and B (FIG. 6), a new resultant voltage curve, the superimposition voltage curve $d'''$ (FIG. 8), is obtained, which is then assignable afresh to the tested winding. The auxiliary voltage $U_{komp}$ is then so modified that $U_x = U_e$ obtains, whereupon the partial discharge extinguishes again. Here, we have :

$$-(N_{2,x}/N_2) \cdot U_{komp} + )U_e + \Delta U_p) = U_e \text{ or}$$

$$0 < (N_{2,x}/N_2) = \Delta U_p/U_{komp} \leq 1$$

With the help of this formula, it is possible, as in the foregoing example and after determination of $\Delta U_p$ and $U_{komp}$, to calculate the faulty point in the winding from the total number of turns $N_2$ of the tested winding. Here again, it is of course possible instead of the auxiliary voltage $U_{komp}$ to so regulate the test voltage $U_p$ that $U_x = U_e$ or for that matter to regulate both voltages.

In this method using $U_e$ as the indicator, it is not possible, either when testing with an induced voltage or with an applied voltage, for any other partial discharge location to occur because during pinpointing no part of the winding is subjected to a voltage which is any higher than obtained in the condition under which the partial discharge struck for the first time.

The electrical discharge may be located not, as in the preceding examples, in the space between the tested winding and the housing, but quite generally in an insulation space between the tested winding and some electrically conductive component, for example in the space between the tested winding and another winding, a part of the magnetic circuit of the apparatus, the adjacent effective earth (in the absence of any electrically conductive housing), or also for that matter components installed inside the apparatus as for example screening arrangements, supply leads, switch components, control elements and so on. The fault pinpointing procedure in accordance with the invention can in principle be applied to all these cases. If, in addition to the tested winding, the electrically conductive component (for example another winding) which bounds the insulation space in which the discharge between said electrically conductive component and the tested winding has taken place, also has a known voltage distribution in respect of the test and auxiliary voltages employed in testing and pinpointing, then the difference between the voltage distributions, i.e. the curve representing the difference between the striking or extinguishing limit voltages, the superimposition voltages, etc (of tested winding and electrically conductive component), is of critical importance in the pinpointing operation.

The test voltage and the auxiliary voltage need not necessarily have a sinusoidal waveform. It is equally possible to use pulse voltages which have linear or non-linear but no local voltage distributions in the coil, or again repetition voltage processes of arbitrary form, e.g. half-waves, likewise with known local voltage distributions. equally, as far as test and auxiliary voltages are concerned, it is not absolutely essential to use voltages of the same type. Moreover, one of the voltages could be a direct one. For example, when carrying out fault pinpointing with an induced voltage (FIG. 2) as the test voltage, the auxiliary voltage can be direct voltage, whilst when testing with an applied voltage (FIG. 6), a direct test voltage is quite conceivable. In the case of an a.c. voltage, test voltage and auxiliary voltage need not necessarily have the same frequency.

When using the above-described different kinds of voltages, the establishment of fault pinpointing, can in principle be arrived at not only by amplitude adjustment of auxiliary and/or test voltages, but, given a suitable voltage form, equally by shifting the relative phase positions of auxiliary and test voltages, or, if one of them is a pulse voltage, by shifting the synchronisation trigger point of the pulse voltage or voltages. Again, a combination of amplitude control and time-shift in auxiliary and test voltages, is possible.

If the apparatus has only one winding, then for example the housing can be regarded as a second winding with zero turns and the "induced voltage" then means that voltage which is applied directly across the winding terminals. The "applied voltage" will then be that voltage which is applied between the single winding and the housing.

Where there are several windings, for testing and possible pinpointing, it is possible to deal with the windings in successive pairs. The windings which are in each case not involved by the particular test operation, must then be open-circuit and connected to the housing.

Figure 9:
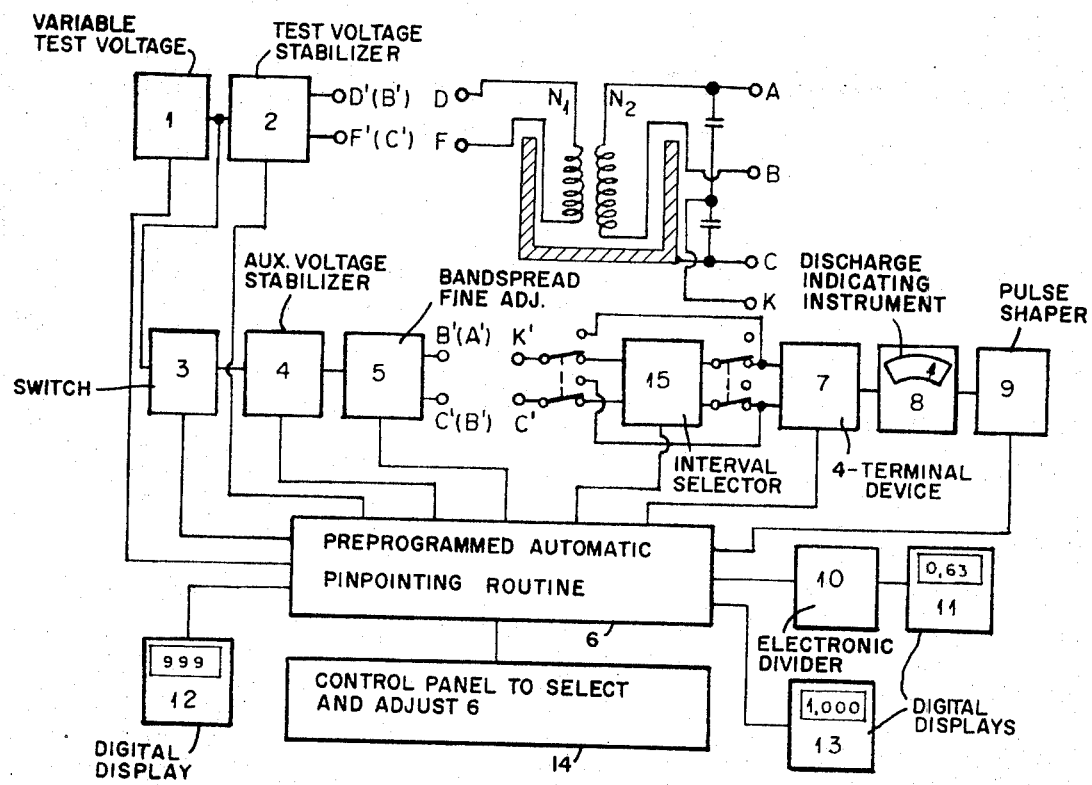
FIG. 9 is a block diagram of an automatic test and pinpointing device for implementing the methods described in FIGS. 1 to 8.

In FIG. 9, the block diagram of an automatic test and pinpointing device for implementing the aforedescribed examples of the method of the invention, is illustrated. Here :

1 = variable test voltage source
2 = test voltage stabiliser, temporarily (during pinpointing) operative and controlled by unit 6.
3 = switch, controlled by unit 6, for switching the auxiliary voltage from "Addition" to "Subtraction" when a change in indicator from $U_i$ to $U_e$ is made.
4 = auxiliary voltage stabiliser, which can be disconnected by unit 6.
5 = bandspread fine adjustment of the auxiliary voltage.
6 = preprogrammed automatic pinpointing routine, with store.
7 = selective or matching preliminary four-terminal device associated with discharge indicating instrument.
8 = discharge indicating instrument, for example partial discharge parasitic voltage measuring instrument.
9 = electronic pulse-shaper unit with $U_i$, $U_e$ discriminator action, producing control pulses for processing in routiner 6.
10 = electronic divider for calculating $(\Delta U_p/U_{komp})$ or $(U_{komp}/\Delta U_p)$
11 = digital display of the pinpoint $N_{2,x}/N_2$
12 = digital display or/and recorder for $U_p$.
13 = digital display or/and recorder for $U_{komp}$.
14 = control panel for selection and adjustment of the automatic test and pinpointing routine.
15 = arrangement for selecting a specific interval in the voltage-time characteristic.

The terminals A, B . . . K of the test subject are intended for connection to the similarly designated terminals A',B' . . . K' of the automatic test and pinpointing device. Between K'C' and unit 7 (FIG. 9), it may be advantageous, for purposes of detection of the discharge signal, to connected a device which selects a specific interval of variable length in the voltage-time characteristic of the tapped off discharge signal, this without placing any attenuative load at the equipment side of the output KC for the discharge signal, on the discharge indicating instrument at unit 7. The heart of the automatic device is the automatic routiner (unit 6) which is responsible for controlling the four operating routines, in fact for carrying out pinpointing with an applied or induced test voltage, using $U_i$ or $U_e$ as the indication. Through the agency of the control panel 14, the unit 6 is set to one of these routines. The pulses produced by the pulse-shaper unit 9 from the output signal furnished by the discharge indicating instrument, for example a partial discharge parasitic voltage measuring instrument, are employed in the unit 6 to control the pinpointing routine and to determine the times (instants) of the significant voltage readings. The aforesaid pulses and voltage readings are stored in the store of unit 6 for ensuing processing and output.

Self-evidently, it is equally possible to carry out the aforesaid test and pinpointing operations by means of phase control, if the test and auxiliary voltages required for the pinpointing operation are a.c. voltages of like frequency.

Figure 10:
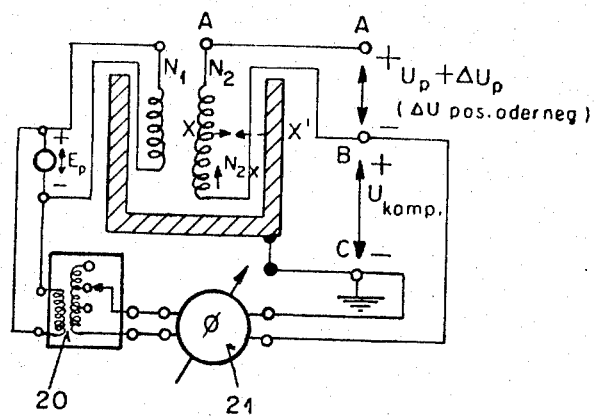
FIG. 10 is a fundamental diagram similar to that of FIG. 2, of the pinpointing arrangement with phase regulator.

Using a procedure similar to that employed when testing with induced voltage and carrying out pinpointing by amplitude adjustment of the auxiliary and/or test voltages, as in FIGS. 1 and 2, in testing with an induced voltage and carrying out pinpointing using phase adjustments, in accordance with FIG. 10, first of all the striking or extinguishing voltage $U_{i(e)}$ (an abbreviated convention for $U_i$ or $U_e$), is determined. The time function of the discharge striking or extinguishing voltage, at the point X–X' where the insulation fault is occurring, then reads :

$$U_{i(e),x} \cdot \sqrt{2} \cos \omega t = (N_{2,x}/N_2) \, U_{i(e)} \, \sqrt{2} \cos \omega t$$

The test voltage is then modified to $U_p = U_{i(e)} + \Delta U_p$ where $\Delta$, in pinpointing arrangements using phase adjustment, has a positive or negative sign. $\Delta U_p < 0$ or $\Delta U_p > 0$, depending upon whether the striking or extinguishing of the electrical discharge is to be used as the indicator of the fact that the fault has been pinpointed, and, too, $|\Delta U_p|$ will advantageously be selected as small as possible just as in the aforedescribed test and pinpointing arrangements. Across the terminals B and C (FIG. 10) subsequently an auxiliary voltage $U_{komp}$ $2\cdot\cos(\omega t + \phi)$ is applied, where $\phi$ can be adjusted using a phase regulator (phase-shift device) 21. In this context, the adjustment of $\phi$ will preferably commence from $\phi - \pi$ or $\phi = \pi/2$, if the striking or extinguishing, respectively, of the electrical discharge is to be used as the indicator of the fact that the fault has been pinpointed (i.e. at $\Delta U_p < 0$ or $\Delta U_p > 0$). We then obtain for the superimposed voltage at the point X–X' (FIG. 10):

$$U_x \cdot \sqrt{2} \cos(\omega t + \delta) = \frac{N_{2,x}}{N_2}(U_{i(e)} + \Delta_p) \cdot \sqrt{2} \cos \omega t + U_{komp} \cdot \sqrt{2} \cos(\omega t + \phi) =$$

$$\sqrt{\frac{N_{2,x}^2}{N_2^2}(U_{i(e)} + \Delta U_p)^2 + U_{komp}^2 + 2 \cdot \frac{N_{2,x}}{N_2}(U_{i(e)} + \Delta U_p) \cdot U_{komp} \cdot \cos \phi} \sqrt{2}\cos(\omega t + \delta)$$

If $\phi$ is adjusted so that A becomes $(N_{2,x}/N_2) \cdot U_{i(e)} = U_{i(e)} = U_{i(e),x}$, i.e. $(N^2_{2,x}/N_2) \cdot \Delta U_p \cdot (2 \cdot U_{i(e)} + \Delta U_p) + (N_{2,x}/N_2) \cdot 2(U_{i(e)} + \Delta U_p) \cdot U_{komp} \cdot \cos \omega + U_{komp}^2 = 0$ (quadratic equation in terms of $N_{2,x}/N_2$) then the striking or extinguishing of the electrical discharge provides the indication that the adjusted condition corresponding to the pinpointing of the fault, has been reached.

By solving the above quadratic equation for $N_{2,x}/N_2$ $$\frac{N_{2,x}}{N_2} = \frac{U_{komp}}{\Delta U_p}\left[\frac{-(U_{i(e)} + \Delta U_p)\cos\phi \pm \sqrt{(U_{i(e)} + \Delta U_p)^2 \cdot \cos^2\phi - \Delta U_p(\Delta U_p + 2 \cdot U_{i(e)})}}{2 U_{i(e)} + \Delta U_p}\right] \quad (1)$$

the turn at the point X–X'. which contains the faulty insulation, can fundamentally be determined from $U_{i(e)}$, $N_2$ and the values of $\Delta U_p$, $U_{komp}$ and $\phi$ which are technically not mutually exclusive. If, therefore, the expression (1) for $N_{2,x}/N_2$ is to be further technically interpreted, then, because of the conditions in accordance with $N_{2,x}/N_2 > 0$ and the discriminate of the quadratic equation $\geq 0$, these being imposed by physical considerations, we must have either: $\Delta U_p > 0$ i.e. extinguishing of the discharge as the pinpointing indicator, $$-\sqrt{\frac{\left(1 + \frac{U_e}{U_e + \Delta U_p}\right)}{\left(1 + \frac{U_e}{\Delta U_p}\right)}}$$

thus the extinguishing of the discharge as the pinpointing indicator the preferred starting point of the $\phi$ shift will be $\pi/2$; a phase-shift of $\pi/2$ to $\pi$; or:

$\Delta U_p < 0$ i.e. the striking of the discharge is used as the indicator in pinpointing;

$-1 \leq \cos \phi$ 1 in association with $\Delta U_p < 0$ the starting point of the $\phi$ shift will preferably be $\pi$; a phase-shift from $\pi$ to $2\pi$ or 0.

In the first case, using the extinguishing of the discharge as the pinpointing indicator, with an auxiliary voltage $\sqrt{U_{komp}} = \Delta U_p(2U_e + \Delta U_p)$ selected by the amplitude selector 20, it follows from the condition $0 < (N_{2,x}/N_2) \leq 1$, that the expression (1) is only valid if the sign is +, the limiting values of $\cos \phi = -1$ and $$\sqrt{\frac{\left(1 + \frac{U_e}{U_e + \Delta U_p}\right)}{\left(1 + \frac{U_e}{\Delta U_p}\right)}}, \quad \text{indicating the}$$

pinpointing limits $(N_{2,x}/N_2) = \sqrt{\Delta U_p/(2U_e + \Delta U_p)}$ and $(N_{2,x}/N_2) = 1$. All fault locations with $N_{2,x}/N_2$ values between $\sqrt{\Delta U_p/(2U_e + \Delta U_p}$ and 1, can thus in principle be pinpointed if $\phi$ is varied from $\pi/2$ to $\pi$. Considering a fault location for which $(N_{2,x}/N_2) < \sqrt{\Delta U_p/(2U_e + \Delta U_p)}$ holds, the phase-shift must be carried out with a reduced $U_{komp}$ value, e.g. half the value. With the consequent expansion of the bottom pinpointing limit, however, the − must now be taken account of in expression (1). Taking into account the + and − in expression (1), with $U_{komp} = \Delta U_p$ the extended pinpointing range moves to a position between the pinpointing limits $(N_{2,x}/N_2) = \Delta U_p/(2U_e + \Delta U_p)$ and $(N_{2,x}/N_2) = 1$. Whether or not in a given pinpointing case, the + or the − sign is to be taken account of in expression (1), will be indicated by a second measurement using a somewhat smaller $U_{komp}$ value. With $N_{2,x}/N_2$ as an invariable, in accordance with expression (1) a smaller $U_{komp}$ will yield a more negative or less negative $\cos \phi$ value in pinpointing, depending upon whether the + or − sign applies. The bottom pinpointing limit in trying to locate the fault position by shifting the phase from $\pi/2$ to $\pi$, can be brought arbitrarily close to $(N_{2,x}/N_2) = 0$, the phase-shift on each occasion being continued with a reduced $U_{komp}$ value.

In the event that the striking of the discharge has been used as the indicator for the pinpointing, (i.e. at $\Delta U_p < 0 -1 \leq \cos \leq 1$), in expression (1) only the negative sign applies since $N_{2,x}/N_2$ cannot be negative. $U_{komp} = \sqrt{-\Delta U_p(2U_i + \Delta U_p)}$ gives a pinpointing range between $(N_{2,x}/N_2) = 1$ and $(N_{2,x}/N_2) = \sqrt{\Delta U_p/(2U_i + \Delta U_p)}$, and in pinpointing only negative $\cos \phi$ values can occur. With a smaller $U_{komp}$ value, $U_{komp} = -\Delta U_p = |\Delta U_p|$, the limiting values $\cos \phi = -1$ and $+1$ yield an expanded pinpointing range between the limits $(N_{2,x}/N_2) = -\Delta U_p/(2U_i + \Delta U_p)$ and $(N_{2,x}/N_2) = 1$. The bottom pinpointing limit can here again be brought arbitrarily close to $N_{2,x}/N_2 = 0$ by carrying out the phase-shift from $\pi$ to $2\pi$ (or 0) in each case with a reduced (e.g. halved) $U_{komp}$ value. For similar reasons to those applying to testing with an induced voltage and pinpointing with amplitude control of the auxiliary and/or test voltages (FIG. 2), here again $|\Delta U_p|$ should be selected as small as possible so that the requisite auxiliary voltage $U_{komp}$ can also be made small.

Figure 11:
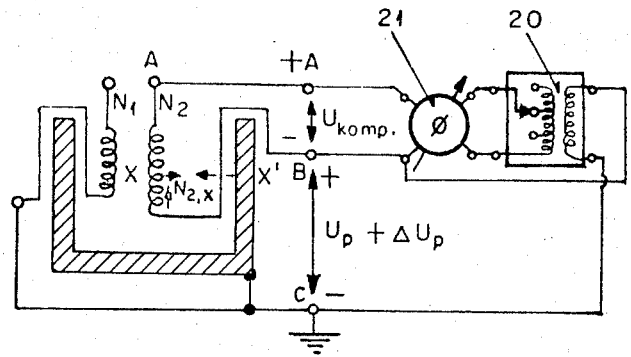
FIG. 11 is a fundamental diagram similar to that of FIG. 6, of the pinpointing arrangement with phase regulator.

In FIG. 11, by way of an example a fundamental diagram similar to that if FIG. 5 has been shown, relating this time to a pinpoint arrangement employing phase adjustment in the context of testing with an applied voltage.

By a similar procedure to that employed with testing by an applied voltage and pinpointing with amplitude control of the auxiliary and/or test voltages (FIG. 5), here again, first of all the striking or extinguishing voltage $U_{i(e)}$ is determined. The time function of the discharge striking or extinguishing voltage at the point X–X' where the insulation fault is located, runs as follows, considering testing with an applied voltage :

$$U_{i(e),x} \cdot \sqrt{2} \cdot \cos \omega t = U_{i(e)} \cdot \sqrt{2} \cos \omega t.$$

The test voltage (FIG. 11) applied between the winding and point C, is then altered to $U_p = U_{i(e)} + \Delta U_p$, where $\Delta$ here, in pinpointing arrangements using phase adjustment, has a positive or negative sign, i.e. $\Delta U_p > 0$ or $< 0$ depending upon whether the striking or extinguishing of the electrical discharge is to be used as the indicator of the fact that the fault has been pinpointed. Also, $|\Delta U_p|$, as in the previously described test and pinpointing examples, should be chosen as small as possible. In the winding, subsequently, an auxiliary voltage $U_{komp} \cdot \sqrt{2} \cdot \cos(\omega t + \phi)$ is induced between the points A and B (FIG. 11), $\phi$ being variable by means of a phase-shift device 21. The adjustment of $\phi$ will preferably commence from the starting point $\phi = \pi/2$ or $\phi = \pi$, depending upon whether the extinguishing or striking of the electrical discharge is to be used as the indicator of the fact that the fault has been pinpointed. We then obtain from the superimposed voltage at the point X–X' (FIG. 11):

$\Delta U_p > 0$ the indication of pinpointing is the extinguishing of the discharge, $$-1 \leq \cos \phi \leq -\sqrt{\frac{\left(1+\frac{U_e}{U_e+\Delta U_p}\right)}{\left(1+\frac{U_e}{\Delta U_p}\right)}}$$

$\pi/2$ being the preferable starting point for the shift in $\phi$; a phase-shift from $\pi/2$ to $\pi$;
or :

$\Delta U_p < 0$ pinpointing indication in the form of striking of the discharge,
$-1 \leq \cos \phi \leq 1$ $\pi$ being the preferential starting point of the $\phi$ shift; phase-shift from $\pi$ $2\pi$ or $0$.

In the first case, where the extinguishing of the discharge is taken as the indication that pinpointing has been achieved, with an induced auxiliary voltage of $U_{komp} = \sqrt{\Delta U_p(2U_e+\Delta U_p)}$ between the points A and B of the winding (FIG. 11), it follows from the expression $0 < (N_{2,x}/N_2) \leq 1$ that exclusively the + sign is valid in expression (2). Taking the limiting values $\cos \phi = -1$ and $$-\sqrt{\frac{\left(1+\frac{U_e}{U_e+\Delta U_p}\right)}{\left(1+\frac{U_e}{\Delta U_p}\right)}},$$

$$U_x \cdot \sqrt{2} \cos (\omega t + \delta) = \frac{N_{2,x}}{N_2} \cdot U_{komp} \sqrt{2} \cdot \cos (\omega t + \phi) + U_{i(e)} + \Delta U_p) \sqrt{2} \cdot \cos \omega t$$

$$= \sqrt{\frac{N_{2,x}^2}{N_2^2} \cdot U_{komp}^2 + (U_{i(e)} + \Delta U_p)^2 + 2\frac{N_{2,x}}{N_2} \cdot U_{komp}(U_{i(e)} + \Delta U_p) \cos \phi} \cdot \sqrt{2} \cdot \cos (\omega t +)$$

If $\phi$ is adjusted so that $$\sqrt{\frac{N_{2,x}^2}{N_2^2} \cdot U_{komp}^2 + (U_{i(e)} + \Delta U_p)^2 \pm 2\frac{N_{2,x}}{N_2} \cdot U_{komp}(U_{i(e)} + \Delta U_p) \cdot \cos \phi} \text{ becomes}$$

$U_{i(e)x} = U_{i(e)}$, i. e.

$(N_{2,x}^2/N_2^2) \cdot U_{komp}^2 + (N_{2,x}/N_2) \cdot 2 \cdot U_{komp}(U_{i(e)} + \Delta U_p)\cos ) + \Delta U_p(\Delta U_p + 2U_{i(e)}) = 0$ (quadratic equation in terms of $(N_{2,x}/N_2)$!), then the striking or extinguishing of the electrical discharge constitutes the indication that the adjusted condition corresponding to the pinpointing of the fault, has been reached.

Solving the quadratic equation for $N_{2,x}/N_2$, we obtain :

$$\frac{N_{2,x}}{N_2} = \frac{(U_{i(e)} + \Delta U_p) \cos \phi \pm \sqrt{(U_{i(e)} + \Delta U_p)^2 \cos^2 \phi - \Delta U_p(\Delta U_p + 2U_{i(e)})}}{U_{komp}} \quad (2)$$

and thus the curve exhibiting the weak insulation at point X–X', can fundamentally be determined from $U_{i(e)}$, $N_2$ and the values of $\Delta U_p$, $U_{komp}$ and $\Delta$ which are technically not mutually exclusive.

Similarly to the preceding example in accordance with FIG. 10, here, too, because of the conditions in accordance with which $(N_{2,x}/N_2) > 0$ and the discriminant of the quadratic equation $\geq 0$, it follows that the expression (2) to be capable of application, either :

a pinpointing range with the range limits $(N_{2,x}/N_2) = \sqrt{\Delta U_p/(2U_e + \Delta U_p)}$ and $(N_{2,x}/N_2) = 1$ is obtained. In the case of fault locations at which $(N_{2,x}/N_2) < \sqrt{\Delta U_p/(2U_e + \Delta U_p)}$ applies, the phase-shift must be continued with a reduced $\Delta U_p$ value and a correspondingly reduced value $U_{komp} = \sqrt{\Delta U_p \cdot (2U_e + \Delta U_p)}$ The lowering of the bottom pinpointing limit can also be achieved by making $U_{komp}$ larger for the same $\Delta U_p$, although this is not generally advisable. For example, taking $U_{komp} = 2U_e + \Delta U_p$, although a wider pinpointing range would be obtained, with pinpointing limits of $(N_{2,x}/N_2) = \Delta U_p/(2U_e + \Delta U_p)$ and $N_{2,x}/N_2 = 1$ corresponding to $\cos = -1$ both + and − signs would have to be taken account of (2). Which sign is to be used in a given pinpointing case would then have to be clarified by a second measurement using a somewhat smaller $U_{komp}$ value. With $N_{2,x}/N_2$ invariable, then, in accordance with expression (2), taking a smaller $U_{komp}$ value in the pinpointing operation a more negative or less negative case would be obtained depending upon whether the + or − sign applied. Again, with the phaseshift method, two high a $U_{komp}$ value in the neighbourhood of the starting point could cause aome other fault location to produce an electrical dischargw, something which is of course undesirable.

In the event that the striking of the discharge has been chosen as the pinpointing indicator (i.e. $U_p$ 0,−1 cos ζ 1), in the expression (2) it is exclusively the − sign which applies because $N_{2,x}/N_2$ cannot be negative.

With an induced auxiliary voltage of $U_{komp} = \sqrt{-\Delta U_p(2U_f + \Delta U_p)}$ between the points A and B of the winding (FIG. 11), because of the condition $0 < (N_{2,x}/N_2) \leq 1$, a pinpointing range, with limits of $(N_{2,x}/N_2) = \sqrt{-\Delta U_p/(2U_f + \Delta U_p)}$ and, $N_{2,x}/N_2 = 1$ is obtained and exclusively positive cos φ values can occur in pinpointing. In the case of faultlocations at which $N_{2,x}/N_2 < \sqrt{-\Delta U_p/(2U_f + \Delta U_p)}$ applies, the phaseshift must be continued using a reduced Δ $U_p$ value and correspondingly reduced value of $U_{komp} = \sqrt{-U_p(2U_f + \Delta U_p)}$ The reduction in the bottom pinpointing limit can also be achieved by selecting a larger $U_{komp}$ value for the same $\Delta U_p$ value, although this is not generally advisable. Taking for example $U_{komp} = 2U_f + \Delta U_p$, although a wider pinpointing range with pinpointing limits of $N_{2,x}/N_2 = -\Delta U_p/(2U_f + \Delta U_p)$ and $N_{2,x}/N_2 = 1$ corresponding to cos φ =+1, and cos φ =−1, would be obtained, if $U_{komp}$ is too large there is an increased chance that with the phaseshift operation some other fault location will be caused to produce an electrical discharge, and this is of course undesirable. In the examples of pinpointing arrangements shown in FIGS. 10 and 11, the phaseshift devices arranged in the auxiliary voltage circuit. However, modifications of the arrangements are entirely conceivable, in which the phaseshift device is contained in the test voltage circuit or in both test voltage and auxiliary voltage circuits.

In the pinpointing arrangement examples of FIGS. 6 and 11, the induced auxiliary voltage is applied directly across the winding under test, which has $N_2$ turns. Self-evidently, it is equally possible to apply the induced auxiliary voltage after the switch 18 (FIG. 6) or after the phaseshift device 21 (FIG. 11), across the second winding if such is available (for example the winding with $N_1$ turns in FIGS. 6 to 11).

If the electrical discharge take place in the insulation space between two windings, in determining the point which is producing the electrical discharge the numbers of turns in both windings must be taken into account.

Figure 12:
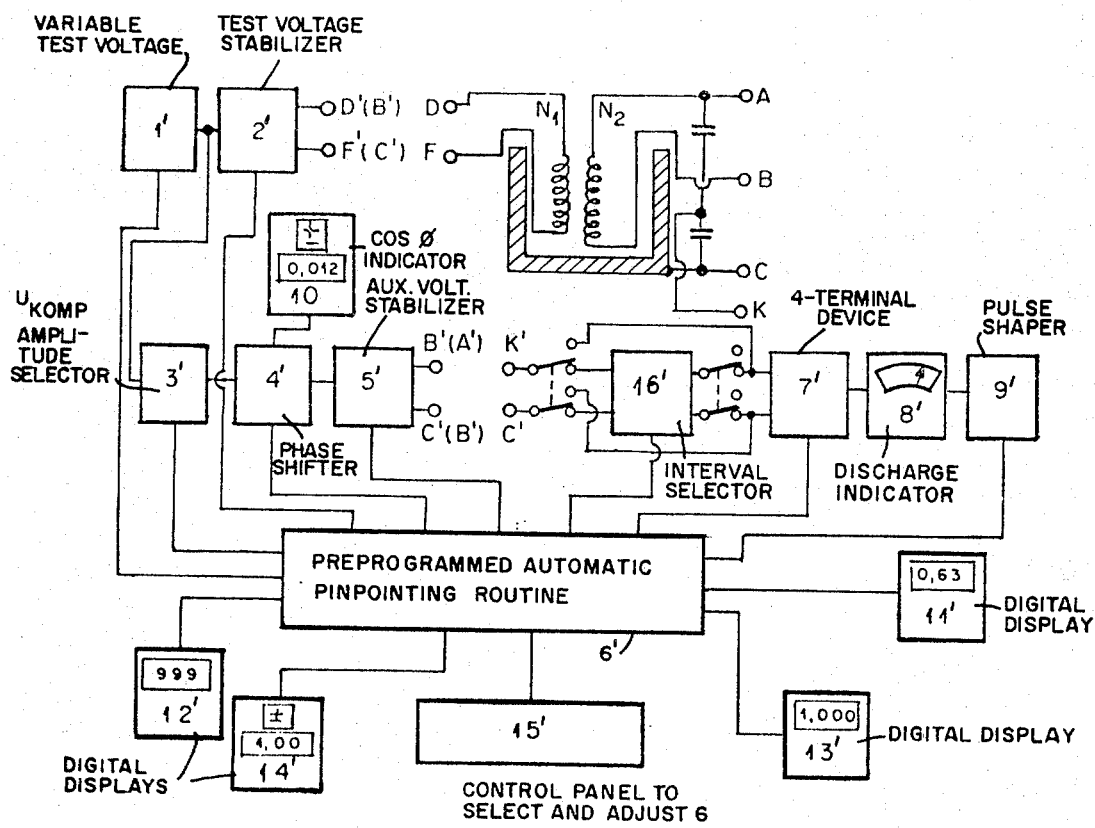
FIG. 12 is a block diagram of an automatic test and pinpointing device for carrying out the methods described in relation to FIGS. 10 and 11.

In FIG. 12, the block diagram of an example of an automatic pinpointing device for carrying out the methods explained in relation to FIGS. 10 and 11, is illustrated. The references here have the following significances:

1′ = variable test voltage source with automatic reducing system controlled by unit 6′ (e.g. halving system), for $U_p$.

2′ = test voltage stabiliser; only temporarily operative (during pinpointing), and controlled by unit 6′.

3′ = $U_{komp}$ amplitude selector (transformer), with automatic reducing system for $U_{komp}$, controlled by unit 6′.

4′ = continuous phaseshift device for the auxiliary voltage.

5′ = auxiliary voltage stabiliser, controlled by unit 6′.

6′ = preprogrammed automatic pinpointing routiner with storer.

7′ = selective or matching preliminary four-terminal device for the discharge indicating instrument.

8′ = discharge indicating instrument, for example partial discharge parasitic voltage measuring instrument.

9′ = electronic pulse-shaper unit with $U_t$, $U_c$—discriminating action, supplies control pulses for processing in routine as 6′.

10′= cos φ − indication with sign indicator

11′ = digital display of the pinpointing position $N_{2,x}/N_2$

12′= display and/or recorder for $U_p$

13′= digital display and/or recorder for $U_{komp}$

14′= digital display or/and recorder for $|\Delta U_p|$ with sign indicator.

15′= control panel for selecting and adjusting the automatic testing and pinpointing.

16′= Arrangement for selecting a specific interval in the voltage-time function.

I claim:

1. A method of testing an insulated winding incorporated in an electrical apparatus and pinpointing any fault which may exist in the insulation between any point along the winding and an electrically conductive component of the apparatus, the pattern of the voltage distribution along the winding being known, which comprises the steps of:

applying a progressively increasing test voltage across the ends of said winding until a partial discharge strikes between the winding and the electrically conductive component of the apparatus, decreasing the test voltage until the partial discharge extinguishes, again increasing the test voltage to a level just under that at which a partial discharge would again be struck, adding to said test voltage an auxiliary voltage applied between one end of said winding and the electrically conductive component and which is varied until said partial discharge re-strikes, and determining the location of the faulty turn in said winding where the partial discharge struck from the ratio of the test and auxiliary voltages and the total number of turns in the winding.

2. A method of testing an insulated winding as defined in claim 1 wherein said test and auxiliary voltages are of the alternating current type and have the same phase and frequency.

3. A method of testing an insulated winding as defined in claim 1 wherein said test and auxiliary voltages are of the alternating type and have the same frequency and which includes the step of also varying the phase of said auxiliary voltage relative to that of said test voltage.

4. A method of testing an insulated winding incorporated in an electrical apparatus and pinpointing any fault which may exist in the insulation between any point along the winding and an electrically conductive component of the apparatus, the pattern of the voltage distribution along the winding being known, which comprises the steps of:

applying a progressively increasing test voltage across the ends of said winding until a partial discharge strikes between the winding and the electrically conductive component of the apparatus, decreasing the test voltage until the partial discharge extinguishes, again increasing the test voltage to a level just above that where the partial discharge would first strike, subtracting from said test voltage an auxiliary voltage applied between one end of said winding and the electrical conductive component and which is varied until said partial discharge extinguishes again, and determining the location of the faulty turn in said winding where the partial struck from the ratio of the test the auxiliary voltages and the total number of turns in the winding.

5. A method of testing an insulated winding as defined in claim 4 wherein said test and auxiliary voltages are of the alternating current type having the same frequency but displaced in phase by 180°.

6. A method of testing an insulated winding as defined in claim 4 wherein said test and auxiliary voltages are of the alternating current type and have the same frequency and which includes the step of also varying the phase of said auxiliary voltage relative to that of said test voltage.

7. A method of testing an insulated winding incorporated in an electrical apparatus and pinpointing any fault which may exist in the insulation between any point along the winding and an electrically conductive component of the apparatus, the pattern of the voltage distribution along the winding being known, which comprises the steps of:

applying a progressively increasing test voltage between one end of said winding and the electrically conductive component until a partial discharge strikes between the winding and the electrically conductive component of the apparatus, decreasing the test voltage until the partial discharge extinguishes, again increasing the test voltage to a level just under that at which a partial discharge would again be struck, adding to said test voltage an auxiliary voltage applied across the ends of said winding and which is varied until said partial discharge re-strikes, and determining the location of the faulty turn in said winding where the partial discharge struck from the ratio of the test and auxiliary voltages and the total number of turns in the winding.

8. A method of testing an insulated winding as defined in claim 7 wherein said test and auxiliary voltages are of the alternating current type and have the same phase and frequency.

9. A method of testing an insulated winding as defined in claim 7 wherein said test and auxiliary voltages are of the alternating current type and have the same frequency and which includes the step of also varying the phase of said auxiliary voltage relative to that of said test voltage.

10. A method of testing an insulated winding incorporated in an electrical apparatus and pinpointing any fault which may exist in the insulation between any point along the winding and an electrically conductive component of the apparatus, the pattern of the voltage distribution along the winding being known, which comprises the steps of:

applying a progressively increasing test voltage between one end of said winding and the electrically conductive component until a partial discharge strikes between the winding and the electrically conductive component of the apparatus, decreasing the test voltage until the partial discharge extinguishes, again increasing the test voltage to a level just above that where the partial discharge would first strike, subtracting from said test voltage an auxiliary voltage applied across the ends of said winding and which is varied until said partial discharge extinguishes again, and determining the location of the faulty turn in said winding where the partial discharge struck from the ratio of the test and auxiliary voltages and the total number of turns in the winding.

11. A method of testing an insulated winding as defined in claim 10 wherein said test and auxiliary voltages are of the alternating current type having the same frequency but displaced in phase by 180°.

12. A method of testing an insulated winding as defined in claim 10 wherein said test and auxiliary voltages are of the alternating current type and have the same frequency and which includes the step of also varying the phase of said auxiliary voltage relative to that of said test voltage.

* * * * *

UNITED STATES PATENT OFFICE
CERTIFICATE OF CORRECTION

PO-1050
(5/69)

Patent No. 3,753,087             Dated August 14, 1973

Inventor(s)  Tjhing Thian Tan

It is certified that error appears in the above-identified patent and that said Letters Patent are hereby corrected as shown below:

Claim 1, line 19, after "component" insert:

- in order to effect a slight shift in the voltage distribution curve -

Claim 4, line 18, after "component" insert:

- in order to effect a slight shift in the voltage distribution curve -

Claim 4, line 22, after "partial" insert:

- discharge -

Claim 7, line 19, after "winding" insert:

- in order to effect a slight shift in the voltage distribution curve -

Claim 10, line 18, after "winding" insert:

- in order to effect a slight shift in the voltage distribution curve -

Signed and sealed this 20th day of November 1973.

(SEAL)
Attest:

EDWARD M. FLETCHER, JR.
Attesting Officer

RENE D. TEGTMEYER
Acting Commissioner of Patents